United States Patent
Arora et al.

(10) Patent No.: US 11,210,653 B2
(45) Date of Patent: Dec. 28, 2021

(54) METHOD AND SYSTEM FOR PREVENTION OF FRAUDULENT GIFT CARDS VIA BLOCKCHAIN

(71) Applicant: Mastercard International Incorporated, Purchase, NY (US)

(72) Inventors: Ankur Arora, New Delhi (IN); Shuvam Sengupta, Haryana (IN); Nishant Maheshwari, Uttar Pradesh (IN); Jaipal Singh Kumawat, Rajasthan (IN); Vikas Bishnoi, Rajasthan (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 150 days.

(21) Appl. No.: 15/794,322

(22) Filed: Oct. 26, 2017

(65) Prior Publication Data
US 2019/0130387 A1    May 2, 2019

(51) Int. Cl.
*G06Q 20/34*    (2012.01)
*G06Q 30/02*    (2012.01)
(Continued)

(52) U.S. Cl.
CPC ....... *G06Q 20/342* (2013.01); *G06Q 20/3829* (2013.01); *G06Q 30/0207* (2013.01);
(Continued)

(58) Field of Classification Search
CPC ............. G06Q 20/342; G06Q 20/3829; G06Q 20/3825; G06Q 2220/00; H04L 9/0637;
(Continued)

(56) References Cited

U.S. PATENT DOCUMENTS

| 2016/0098730 A1* | 4/2016 | Feeney | G07G 1/0036 705/71 |
| 2016/0267605 A1* | 9/2016 | Lingham | G06Q 40/12 |

(Continued)

OTHER PUBLICATIONS

"White Paper: Digital Assets on Public Blockchains", Mar. 15, 2016, pp. 1-37, BitFury Group Limited.
(Continued)

*Primary Examiner* — John W Hayes
*Assistant Examiner* — Ari Shahabi
(74) *Attorney, Agent, or Firm* — Buchanan Ingersoll & Rooney PC

(57) ABSTRACT

A method for secure usage of a gift card via blockchain includes: storing a blockchain including a specific data value related to a gift card that includes a gift card number and a first recipient address; receiving a transfer request including the gift card number, a first digital signature, and a device identifier; verifying the first recipient address based on the first digital signature; generating a new data value comprising the gift card number, the device identifier, and a second recipient address; transmitting the generated new data value to a node associated with the blockchain; receiving a redemption request from a second computing system including the gift card number, a second digital signature, and a submitted device identifier; verifying the second recipient address and submit device identifier based on the second digital signature and the device identifier, respectively; and transmitting a result of the verification to the second computing system.

12 Claims, 7 Drawing Sheets

(51) Int. Cl.
*G06Q 20/38* (2012.01)
*H04L 9/06* (2006.01)
*H04L 9/08* (2006.01)
*H04L 9/14* (2006.01)
*H04L 9/30* (2006.01)
*H04L 9/32* (2006.01)

(52) U.S. Cl.
CPC .......... *H04L 9/0637* (2013.01); *H04L 9/0861* (2013.01); *H04L 9/14* (2013.01); *H04L 9/30* (2013.01); *H04L 9/3247* (2013.01); *G06Q 20/3825* (2013.01); *G06Q 2220/00* (2013.01)

(58) Field of Classification Search
CPC . H04L 9/0861; H04L 9/14; H04L 9/30; H04L 9/3247
See application file for complete search history.

(56) References Cited

U.S. PATENT DOCUMENTS

| | | | |
|---|---|---|---|
| 2017/0163629 A1* | 6/2017 | Law | H04L 63/0823 |
| 2017/0193503 A1* | 7/2017 | Oppenheim | G06Q 20/401 |
| 2017/0243208 A1 | 8/2017 | Kurian et al. | |

OTHER PUBLICATIONS

Antonopoulos, "Mastering Bitcoin—Unlocking Digital Cryptocurrencies", Dec. 20, 2014, pp. 1-298, O'Reilly Media, Beijing, Cambridge,Famham, Kolin, Sebastopol, Tokyo.

Notification of Transmittal of the International Search Report and The Written Opinion of the International Searching Authority (Forms PCT/ISA/220, PCT/ISA/210 and PCT/ISA/237) dated Nov. 15, 2018, by the European Patent Office in corresponding International Application No. PCT/US2018/048691. (12 pages).

* cited by examiner

METHOD AND SYSTEM FOR PREVENTION OF FRAUDULENT GIFT CARDS VIA BLOCKCHAIN

FIELD

The present disclosure relates to the prevention of fraud with respect to transfer and redemption of gift cards, specifically the use of a blockchain to store details regarding purchase, transfer, and redemption of gift cards to provide for immutability regarding such details and prevent fraudulent usage.

BACKGROUND

Gift cards are a popular way for one person to show appreciation to another. A gift card serves as a useful alternative to cash when providing a gift, as it can provide direction to the recipient while still letting the recipient pick their actual gift. Typically, when a gifter wants to give a gift card to a recipient, the gifter will purchase the gift card directly from an associated retailer or from a third party retailer of gift cards. In most cases, the purchase of a gift card includes the retailer scanning a machine-readable code displayed on the gift card, which will be used to unlock the gift card for usage, either by changing data encoded in the gift card or by sending a transmission to a backend system associated with redemption of the gift card indicating that the gift card has been purchased and should be eligible for redemption.

Unfortunately, such a process provides several opportunities for the perpetration of fraud. For instance, a fraudster may write down the gift card number of a gift card prior to its purchase, and may use the number once the gifter has purchased, and thus activated, the gift card. In addition, a fraudster may steal the physical gift card from the gifter after purchase, which may then be used as there is no protection on usage or transfer of the gift card, unlike with traditional payment cards. In an effort to curb such practices, some retailers provide for electronic gift cards, where a unique code is provided to the gifter or directly to the recipient, which may be redeemed. However, in such cases there still lacks protection for direct theft of the unique code.

Thus, there is a need for a technical solution where the purchase, transfer, and redemption of a gift card may be tracked and monitored in a manner to prevent the fraudulent transfer and usage of a gift card and ensure redemption by the proper recipient.

SUMMARY

The present disclosure provides a description of systems and methods for the secure usage of a gift card via a blockchain. Storing details regarding purchase, transfer, and redemption of a gift card on a blockchain ensures immutability of details such that a nefarious actor cannot fraudulently allege purchase or transfer of a gift card. The use of device identifiers associated with computing devices with respect to transfer and redemption provide an additional layer of security to ensure that compromise of the gift card number alone is insufficient for redemption of the gift card. As a result, only the authorized device having the proper gift card number may redeem the gift card, where such data is immutable and cannot be changed, thus increasing the security with respect to purchase, transfer, and redemption of a gift card without inconveniencing any entity involved.

A method for secure usage of a gift card via blockchain includes: storing, in a memory of a processing server, a blockchain including of a plurality of blocks, wherein each block includes at least a block header and one or more data values, each block header includes at least a timestamp, block reference value, and data reference value, and a specific data value included in one of the plurality of blocks is related to a gift card and includes at least a gift card number and a first recipient address; receiving, by a receiving device of the processing server, a transfer request from a first computing system, wherein the transfer request includes at least the gift card number, a first digital signature, and a device identifier associated with a computing device; verifying, by a verification module of the processing server, the first recipient address based on the first digital signature; generating, by a generation module of the processing server, a new data value comprising at least the gift card number, the device identifier, and a second recipient address upon successful verification of the first recipient address; electronically transmitting, by a transmitting device of the processing server, the generated new data value to a node associated with the blockchain; receiving, by the receiving device of the processing server, a redemption request from a second computing system, wherein the redemption request includes at least the gift card number, a second digital signature, and a submitted device identifier; verifying, by the verification module of the processing server, the second recipient address based on the second digital signature and the submitted device identifier based on the device identifier; and electronically transmitting, by the transmitting device of the processing server, a result of the verification of the second recipient address and the submitted device identifier to the second computing system.

A system for secure usage of a gift card via blockchain includes: a memory of a processing server configured to store a blockchain including of a plurality of blocks, wherein each block includes at least a block header and one or more data values, each block header includes at least a timestamp, block reference value, and data reference value, and a specific data value included in one of the plurality of blocks is related to a gift card and includes at least a gift card number and a first recipient address; a receiving device of the processing server configured to receive a transfer request from a first computing system, wherein the transfer request includes at least the gift card number, a first digital signature, and a device identifier associated with a computing device; a verification module of the processing server configured to verify the first recipient address based on the first digital signature; a generation module of the processing server configured to generate a new data value comprising at least the gift card number, the device identifier, and a second recipient address upon successful verification of the first recipient address; and a transmitting device of the processing server configured to electronically transmit the generated new data value to a node associated with the blockchain, wherein the receiving device of the processing server is further configured to receive a redemption request from a second computing system, wherein the redemption request includes at least the gift card number, a second digital signature, and a submitted device identifier, the verification module of the processing server is further configured to verify the second recipient address based on the second digital signature and the submitted device identifier based on the device identifier, and the transmitting device of the processing server is further configured to electronically transmit a result of the verification of the second recipient address and the submitted device identifier to the second computing system.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments is intended for illustration purposes only and is, therefore, not intended to necessarily limit the scope of the disclosure.

DETAILED DESCRIPTION

Glossary of Terms

Blockchain—A public ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

System for Secure Purchase, Transfer, and Redemption of Gift Cards

Figure 1:
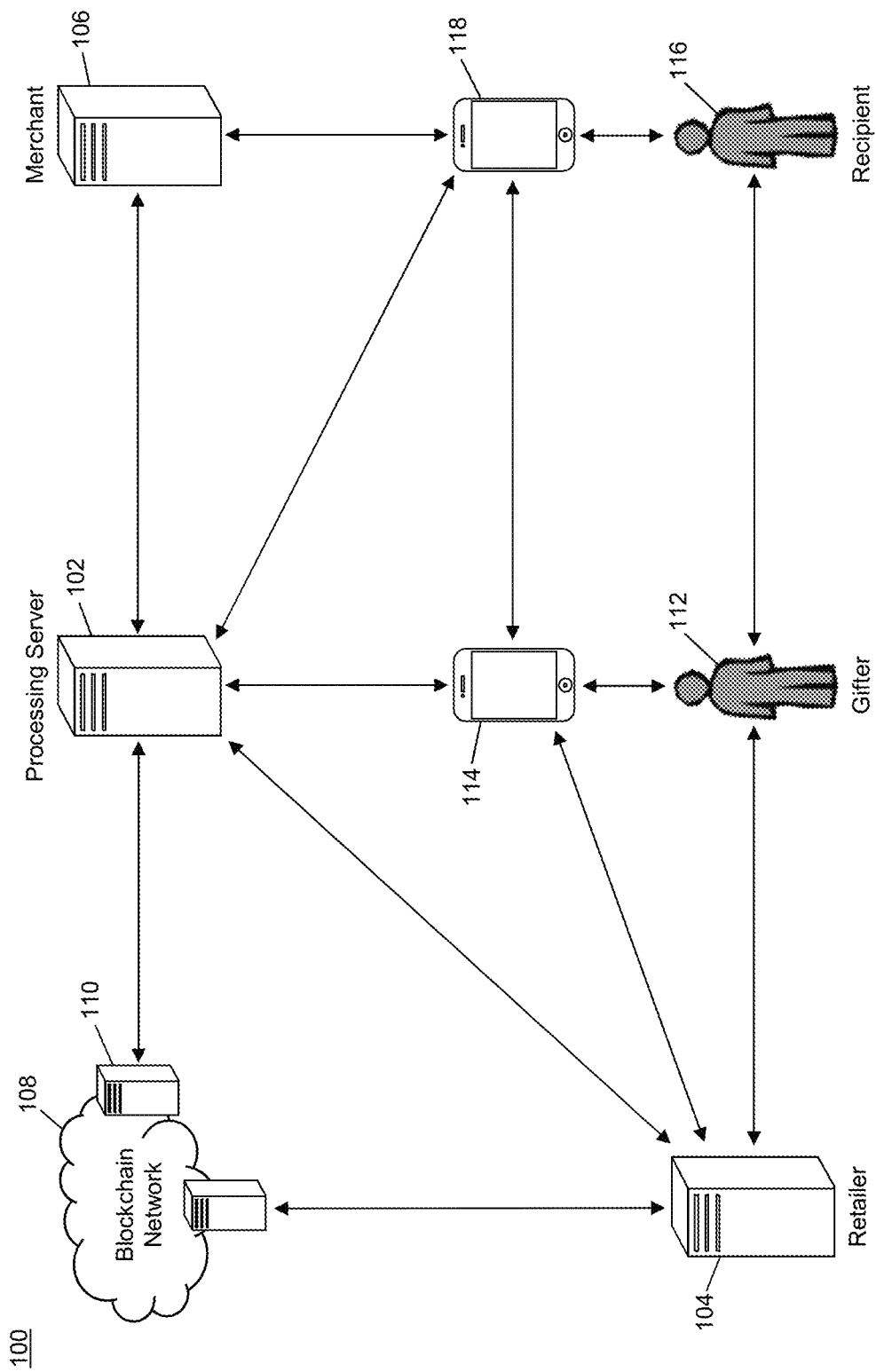
FIG. 1 is a block diagram illustrating a high level system architecture for the secure purchase, transfer, and redemption of gift cards via blockchain in accordance with exemplary embodiments.

FIG. 1 illustrates a system 100 for the secured purchase, transfer, and redemption of gift cards via utilization of a blockchain and the storage of related data therein.

The system 100 may include a processing server 102. The processing server 102, discussed in more detail below, may be configured to utilize a blockchain in the managing of the purchasing, transfer, and redemption of gift cards to increase security and prevent fraud. In the system 100, a retailer 104 may have a gift card available for purchase, where the gift card is eligible for redemption at a merchant 106. In some embodiments, the retailer 104 and the merchant 106 may be a single entity. In some cases, the processing server 102 may be part of a computing system of the retailer 104 and/or merchant 106. The gift card may have at least a gift card number associated therewith, and may also have any additional data associated therewith that may be used in the redemption of the gift card, such as a personal identification number, verification code, expiration date, etc.

Prior to a gift card being made eligible for purchase, the gift card may be registered with a blockchain network 108 associated with the processing server 102. In some embodiments, the retailer 104 may register the gift card directly with the blockchain network 108. In other embodiments, the retailer 104 may electronically transmit the gift card number (e.g., and any other data for redemption, as applicable) to the processing server 102, which will register the gift card on behalf of the retailer 104. Registration of the gift card on the blockchain may include conveyance of the gift card number (e.g., and any other data for redemption, as applicable), as well as a first blockchain address, to a node 110 of the blockchain network 108. The blockchain network 108 may be comprised of a plurality of nodes 110, wherein each node 110 is configured to store blockchain data, generate new blocks for addition to the blockchain, and validate blocks generated by other nodes 110 prior to addition to the blockchain. In some embodiments, the processing server 102 may be a node 110 of the blockchain network 108.

The first blockchain address may be an address associated with the retailer 104 as the current owner of the gift card, also referred to herein as a "first recipient address," as the retailer 104 may be considered an initial recipient, receiving the gift card to make it available for sale. The first blockchain address may be generated by the retailer 104 (e.g., or processing server 102, as applicable) using a public key of a key pair. The key pair may be generated using any suitable type of key generation algorithm. In cases where the processing server 102 may register the gift card, the retailer 104 may provide the first blockchain address to the processing server 102, or the processing server 102 may possess the public key associated with the retailer 104, which may be used to generate the first blockchain address.

The retailer 104 or processing server 102, as applicable, may generate a data value related to the gift card, where the data value includes at least the gift card number (e.g., and any other data for redemption, as applicable) and the first blockchain address. The data value may then be electronically transmitted to a node 110 in the blockchain network 108 for inclusion in a new block that is validated and added to the blockchain using traditional methods and systems.

The blockchain may include a plurality of blocks, where each block includes a block header and one or more data values. The data values may each be associated with the purchase, transfer, or redemption of a gift card. Each block header may include at least a timestamp, a block reference value, and a data reference value. The timestamp may be a stamp of a time when the block header is generated. The block reference value may be a reference to the previous block (e.g., determined via timestamp) in the blockchain. In some cases, the block reference value may be a hash value generated via the application of one or more hashing algorithms to the block header of the previous block. The data reference value may be a reference to the one or more data values included in the respective block. In some cases, the data reference value may be a hash value generated via the application of one or more hashing algorithms, which may be the same or different than those used in generation of the block reference value, to the one or more data values included in the block. The use of the reference values may ensure that the data stored in the blockchain is immutable, as a modification to any data value can be detected via generation of the data reference value, as it would thus differ from the value stored in the block header, which would, in turn, result in a different block reference value for the subsequent block, which would carry on through every subsequent block. As a result, no block header or data value may be modified without requiring modification to every single subsequent block in the blockchain. As each node 110 in the blockchain network 108 may store the blockchain, no modification to the blockchain may be performed without compromise of every single node 110.

The node 110 of the blockchain network 108 may receive the data value from the retailer 104 or processing server 102, which may be included in a newly generated block (e.g., and incorporated into the data reference value in the respective block header). The generated block may be validated by other nodes 110 in the blockchain network 108 using traditional methods, which may include independent generation of the reference values and validation thereof. Once validation is completed, the newly generated block may be added to the blockchain and provisioned to all of the nodes 110 in the blockchain network 108.

Once the gift card has been registered, the gift card may be made available for sale by the retailer 104. In the system 100, a gifter 112 may purchase the gift card from the retailer using any suitable purchasing method. As part of the purchase, the gifter 112 may use a computing device as part of the purchase, referred to herein as a gifter computing device 114. The gifter computing device 114 may be any type of computing device suitable for performing the functions discussed herein, such as a desktop computer, laptop computer, notebook computer, tablet computer, cellular phone, smart phone, smart watch, smart television, wearable computing device, implantable computing device, etc. The gifter computing device 114 may have a device identifier associated therewith, which may be a unique value associated with the gifter computing device 114 suitable for identification thereof. The device identifier may be, for example, a media access control address, registration number, serial number, phone number, e-mail address, username, internet protocol address, etc. As part of the purchasing of the gift card, the gifter 112 may provide the device identifier for the gifter computing device 114 to the retailer 104. For instance, in one example, the gifter 112 may orally communicate the device identifier to an employee of the retailer 104. In another example, the transaction may be an electronic transaction conducted via website or application program by the gifter computing device 114, which may transmit the device identifier to the retailer 104 during the purchase of the gift card.

To register the purchase of the gift card, a new data value may be submitted to a node 110 in the blockchain network 108 for addition to the blockchain. In some embodiments, the new data value may be generated and submitted directly by the retailer 104. In other embodiments, the new data value may be generated and submitted by the processing server 102, which may obtain the device identifier from the retailer 104 via electronic transmission using a suitable communication method. The new data value may include at least the gift card number (e.g., and any other data for redemption, as applicable) and the device identifier associated with the gifter computing device 114. The retailer 104, or processing server 102, as applicable, may also supply a digital signature. The digital signature may be generated by the retailer 104 (e.g., or processing server 102, as applicable) and may be generated via the private key of the key pair that included the public key used to generate the first blockchain address. The node 110 (e.g., which may be the processing server 102, if serving as a node 110) may receive the data value and the digital signature. The digital signature may then be used to verify the first blockchain address. Verification of the first blockchain address via the digital signature may be performed using any suitable technique, and may result in a verification that the entity supplying the digital signature possesses the private key that corresponds to the public key used to generate the first blockchain address, and thus is the entity that initially registered the gift card.

In addition to the gift card number and device identifier, the new data value may also include a second blockchain address. The second blockchain address may be an address associated with the gifter computing device 114 as the purchaser of the gift card. The second blockchain address may be generated via a public key of a key pair unique to the gifter computing device 114. In some embodiments, the gifter computing device 114 may possess a private key of the key pair and may generate the second blockchain address, which may be conveyed to the retailer 104 with the device identifier and subsequently conveyed to the processing server 102 and/or node 110. In other embodiments, the processing server 102 may generate the key pair upon receipt of the data from the retailer 104, may generate the second blockchain address using the public key, and may provision the private key to the gifter computing device 114, which may be contacted and communicated with via the associated device identifier. In some cases, provisioning of the private key may utilize specialized communication methods for the secure communication of data, to reduce likelihood of the private key being compromised during provisioning.

The new data value comprising the gift card number, device identifier associated with the gifter computing device 114, and the second blockchain address may be submitted to a node 110 in the blockchain network 108. The node 110 may then add the new data value to a newly generated block that is then validated and added to the blockchain, as discussed above. In some cases, the node 110 may provide a notification to the processing server 102 that the new data value was successfully added to the blockchain. In other cases, the processing server 102 may monitor the blockchain to identify when the new data value is added. In some instances, the processing server 102 may electronically transmit a notification to the gifter computing device 114 to inform the gifter 112 that their purchase of the gift card has been properly recorded in the blockchain.

Once the gifter's purchase has been recorded, the gifter 112 may gift the gift card to a recipient 116. It will be apparent to persons having skill in the relevant art that the gifter 112 may directly redeem the gift card. In such instances, the gifter 112 may also participate in the system 100 as the recipient 116. As part of the gifting of the gift card to the recipient 116, the gifter 112 may obtain a device identifier associated with a recipient computing device 118 associated with the recipient 118. The recipient computing device 118 may be any type of suitable computing device, including the same computing device as the gifter computing device 114, or other type of computing device. Similarly, the device identifier associated with the recipient computing device 118 may be the same type of device identifier as used for the gifter computing device 114, or may be a different type.

The gifter 112 may submit a transfer request to the processing server 102 via the gifter computing device 114. The transfer request may include at least the gift card number, the device identifier associated with the recipient computing device 118, and a digital signature. The digital signature may be generated via the private key provisioned to the gifter computing device 114, and may be used by the processing server 102 to verify the second blockchain address, to ensure that the gifter 112 is the registered owner of the gift card to be able to gift the gift card, such as discussed above. Following verification, the processing server 102 may generate another new data value that includes the gift card number, the device identifier associated with the recipient computing device 118, and a third blockchain address. The third blockchain address may be associated with the recipient computing device 118 and may be generated via a public key of another key pair. In some cases, the recipient computing device 118 may previously possess the corresponding private key, and may generate the third blockchain address, which may be provided to the gifter computing device 114 for submission to the processing server 102 in the transfer request. In other cases, the processing server 102 may generate the key pair and subsequently generate the third blockchain address via the public key, and may provision the private key to the recipient computing device 118 (e.g., as identified via the device identifier included in the transfer request). The new data value may be transmitted to a node 110 in the blockchain network 108 for addition to the blockchain. In some cases, the processing server 102 may provide a notification to the gifter computing device 114 and/or the recipient computing device 118, indicating that the transfer was recorded in the blockchain successfully.

To redeem the gift card, the recipient 116 may go to the merchant 106 (e.g., physically or virtually, such as via an e-commerce transaction conducted using the Internet) and initiate a transaction. As part of the initiation of the transaction, the recipient 116 may provide the merchant 106 with the gift card number, the device identifier associated with the recipient computing device 118, and a digital signature generated by the private key provisioned to the recipient computing device 118. The merchant 106 may electronically transmit the data to the processing server 102. The processing server 102 may then identify the latest data value added to the blockchain for the gift card (e.g., identified via the gift card number) and verify the third blockchain address via the digital signature and verify that the device identifier stored in the data value is equivalent to the device identifier submitted by the merchant 106 (e.g., and as supplied by the recipient 116). The processing server 102 may provide a result of the verification back to the merchant 106. The merchant 106 may then proceed with the transaction accordingly, such as by allowing redemption of the gift card if the verification was a success, and preventing redemption if the verification failed.

Because verification relies on both the device identifier and the digital signature, a nefarious actor may be unable to redeem the gift card without both accessing the private key (and correctly generating the digital signature therefrom) and spoofing the recipient computing device 118. Both tasks may be exceedingly difficult, such that combination of both tasks for redemption may have such a high level of difficulty so as to dissuade attempts at fraud. In addition, the use of the blockchain may ensure that the backend data for a gift card cannot be changed due to the immutability and decentralized nature of the blockchain, thus preventing a fraudster from, for instance, changing the device identifier for a gift card to their own device. As a result, the processing server 102 may provide for greatly increased security in the registration, transfer, and redemption of gift cards.

In some embodiments, the blockchain may be updated when a gift card is redeemed. In some cases, the blockchain may be updated to indicate that the gift card is no longer available for redemption, such as by storing a new data value for the gift card number that has a device identifier and/or blockchain address that indicates that the gift card is no longer eligible for redemption and/or is impossible to verify, thus preventing redemption. In some cases, the gift card number may be transferred back to the retailer 104 (e.g., to a blockchain address and device identifier associated therewith), for resale. In some embodiments, each data value stored in the blockchain may also include a gift card amount, which may represent the remaining value of the gift card. In such embodiments, if the recipient 116 redeems the gift card for an amount less than the remaining value, a new data value may be generated for addition to the blockchain that includes the device identifier associated with the recipient computing device 118 and a new blockchain address generated via the public key associated with the recipient computing device's private key, as well as an updated gift card amount corresponding to the value of the gift card following redemption. The recipient 116 may then continue to use the gift card, where the gift card amount may be provided to the merchant 106 along with the verification result, which may be used by the merchant 106 to determine if the gift card redemption should be honored and/or for how much. In some such embodiments, when the gift card value is depleted, the ownership may be transferred to the retailer 104 or a third party, where the recipient 116 may be provided with an opportunity to add funds to the gift card and have ownership transferred back using the processes discussed herein.

Processing Server

Figure 2:
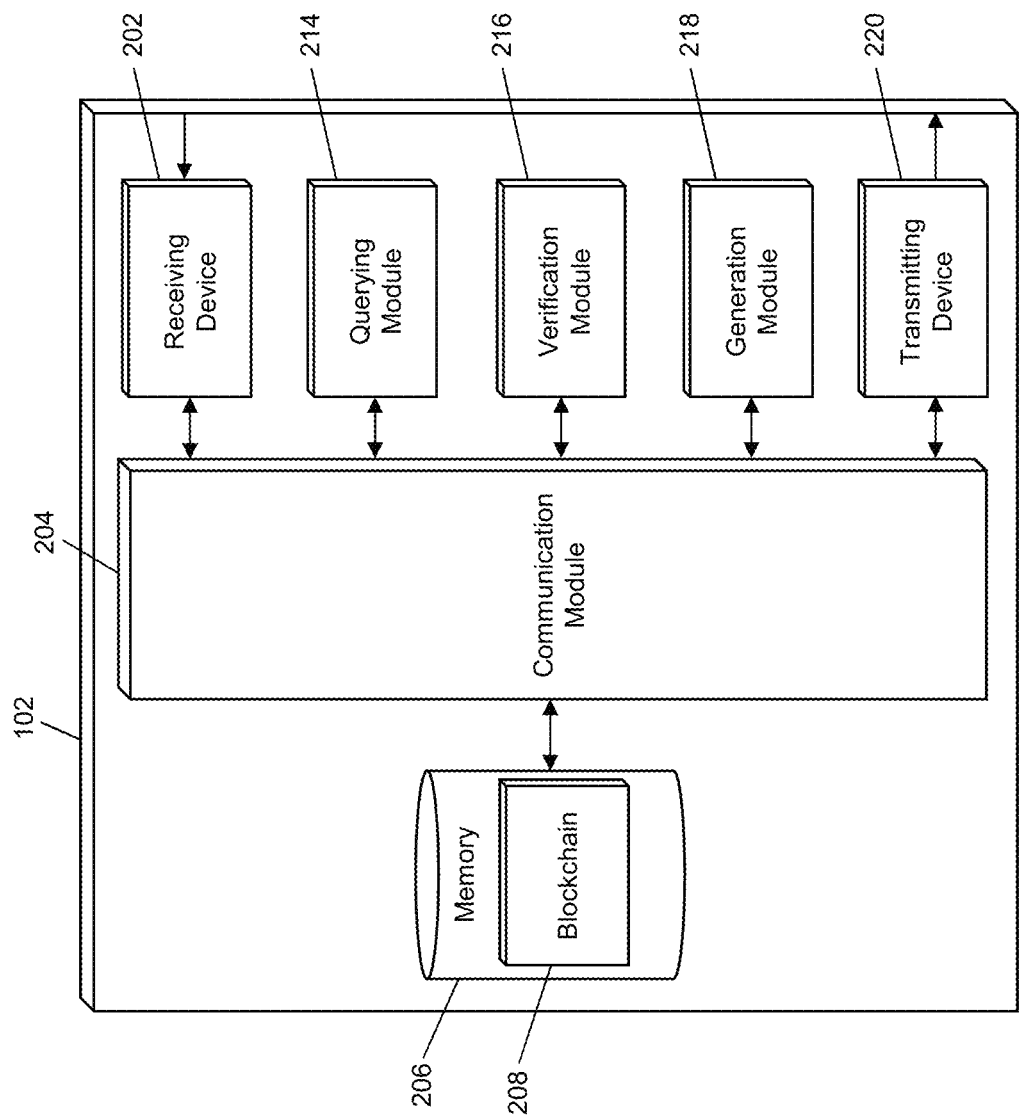
FIG. 2 is a block diagram illustrating the processing server of the system of FIG. 1 for the secure purchase, transfer, and redemption of gift cards via blockchain in accordance with exemplary embodiments.

FIG. 2 illustrates an embodiment of a processing server 102 in the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 700 illustrated in FIG. 7 and discussed in more detail below may be a suitable configuration of the processing server 102.

The processing server 102 may include a receiving device 202. The receiving device 202 may be configured to receive data over one or more networks via one or more network protocols. In some instances, the receiving device 202 may be configured to receive data from retailers 104, merchants 106, nodes 110, gifter computing devices 114, recipient computing devices 118, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by retailers 104, gifter computing devices 114, and recipient computing devices 118, which may be superimposed or otherwise encoded with transfer requests, which may include at least a device identifier, gift card number, and digital signature to be used in the verification and transfer of ownership of a gift card to another entity, and may also include a blockchain address and/or gift card amount, as applicable. In some cases, the receiving device 202 may be configured to receive data signals electronically transmitted by retailers 104, which may be superimposed or otherwise encoded with registration data to register a gift card, which may include at least a gift card number and a blockchain address. The receiving device 202 may also be configured to receive data signals electronically transmitted by nodes 110 in the blockchain network 108, which may be superimposed or otherwise encoded with blockchain data (e.g., newly added blocks) and may also or alternatively be superimposed or otherwise encoded with notifications regarding submitted data values. The receiving device 202 may also be configured to receive data signals electronically transmitted by merchants 106, which may be superimposed or otherwise encoded with redemption requests, which may include at least a gift card number, digital signature, and device identifier, and may, in some cases, further include a transaction amount.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 214, verification module 216, generation module 218, etc. As used herein, the term "module" may be software or hardware particularly programmed to receive an input, perform one or more processes using the input, and provides an output. The input, output, and processes performed by various modules will be apparent to one skilled in the art based upon the present disclosure.

The processing server 102 may include a memory 206. The memory 206 may be configured to store data for use by the processing server 102 in performing the functions discussed herein, such as public and private keys, symmetric keys, etc. The memory 206 may be configured to store data using suitable data formatting methods and schema and may be any suitable type of memory, such as read-only memory, random access memory, etc. The memory 206 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. In some embodiments, the memory 206 may be comprised of or may otherwise include a relational database that utilizes structured query language for the storage, identification, modifying, updating, accessing, etc. of structured data sets stored therein.

The memory 206 may be configured to store a blockchain 208. As discussed above, the blockchain 208 may be include a plurality of blocks, where each block may include at least a block header and one or more data values. Each block header may include a time stamp, a block reference value referring to the preceding block in the blockchain, and a data reference value referring to the one or more data values included in the respective block. The memory 206 may also be configured to store any additional data that may be used by the processing server 102 in performing the functions discussed herein, such as hashing algorithms for generating reference values for the blockchain, communication data for communicating with nodes 110 and other computing devices, etc.

The processing server 102 may include a querying module 214. The querying module 214 may be configured to execute queries on databases to identify information. The querying module 214 may receive one or more data values or query strings, and may execute a query string based thereon on an indicated database, such as the memory 206, to identify information stored therein. The querying module 214 may then output the identified information to an appropriate engine or module of the processing server 102 as necessary. The querying module 214 may, for example, execute a query on the memory 206 to identify a data value stored in a block of the blockchain 208, which may include a specific gift card number corresponding to a gift card number included in a transfer request, for identification of data in the data value for verification prior to transfer or redemption of the related gift card.

The processing server 102 may also include a verification module 216. The verification module 216 may be configured to verify data for the processing server 102 for use in performing the functions discussed herein. The verification module 216 may receive instructions as input, may verify data as instructed, and may output a result of the verification to another module or engine of the processing server 102. For example, the verification module 216 may be configured to verify blockchain addresses via digital signatures, verify device identifiers included in data values with supplied device identifiers, and, in some cases, verify gift card amounts against supplied transaction amounts.

The processing server 102 may also include a generation module 218. The generation module 218 may be configured to generate data for the processing server 102 for use in performing the functions discussed herein. The generation module 218 may receive instructions as input, may generate data based on the instructions, and may output the generated data to one or more modules or engines of the processing server 102. For example, the generation module 218 may be configured to generate new transaction data values for inclusion in the blockchain, including transaction data values related to registration, transfer, and redemption of gift cards, where such data values may include gift card numbers, blockchain addresses, and device identifiers. In some cases, the generation module 218 may be configured to generate data messages to serve as notifications, for electronic transmission to other entities for notifications regarding registration, transfer, or redemption of a gift card. The generation module 218 may also be configured to generate key pairs using suitable key generation algorithms, and may also be configured to generate blockchain addresses via public keys using suitable algorithms designed therefor.

In cases where the processing server 102 may be a part of the blockchain network 108 (e.g., may be a node 110 thereof), the processing server 102 may include additional modules or engines associated with the performance as a node of the blockchain network 108. For instance, the generation module 216 may be configured to generate new blocks and new block headers, a hashing module may be included to generate reference values for inclusion in block headers, the verification module 216 may be configured to verify reference values and new blocks that are submitted (e.g., by other nodes 110) for inclusion to the blockchain, etc.

The processing server 102 may also include a transmitting device 220. The transmitting device 220 may be configured to transmit data over one or more networks via one or more network protocols. In some instances, the transmitting device 220 may be configured to transmit data to retailers 104, merchants 106, nodes 110, gifter computing devices 114, recipient computing devices 118, and other entities via one or more communication methods, local area networks, wireless area networks, cellular communication, Bluetooth, radio frequency, the Internet, etc. In some embodiments, the transmitting device 220 may be comprised of multiple devices, such as different transmitting devices for transmitting data over different networks, such as a first transmitting device for transmitting data over a local area network and a second transmitting device for transmitting data via the Internet. The transmitting device 220 may electronically transmit data signals that have data superimposed that may be parsed by a receiving computing device. In some instances, the transmitting device 220 may include one or more modules for superimposing, encoding, or otherwise formatting data into data signals suitable for transmission.

The transmitting device 220 may be configured to electronically transmit data signals to retailers 104, gifter computing devices 116, and recipient computing devices 118, which may be superimposed or otherwise encoded with notifications, which may notify the respective associated entity that a data value was successfully added to the blockchain. The transmitting device 220 may also be configured to electronically transmit data signals to retailers 104, gifter computing devices 116, and recipient computing devices 118, which may be superimposed or otherwise encoded with private keys being provisioned thereto, such as may be corresponding to public keys of key pairs generated by the generation module 218 used to generate blockchain addresses. The transmitting device 220 may be configured to electronically transmit data signals to nodes 110 in the blockchain network 108, which may be superimposed or otherwise encoded with data values for addition to the blockchain. The transmitting device 220 may also be configured to electronically transmit data signals to merchants 106, which may be superimposed or otherwise encoded with verification results as a response to a verification request for verification of redemption of a gift card.

Process for Registration and Purchase of a Gift Card Via Blockchain

Figure 3:
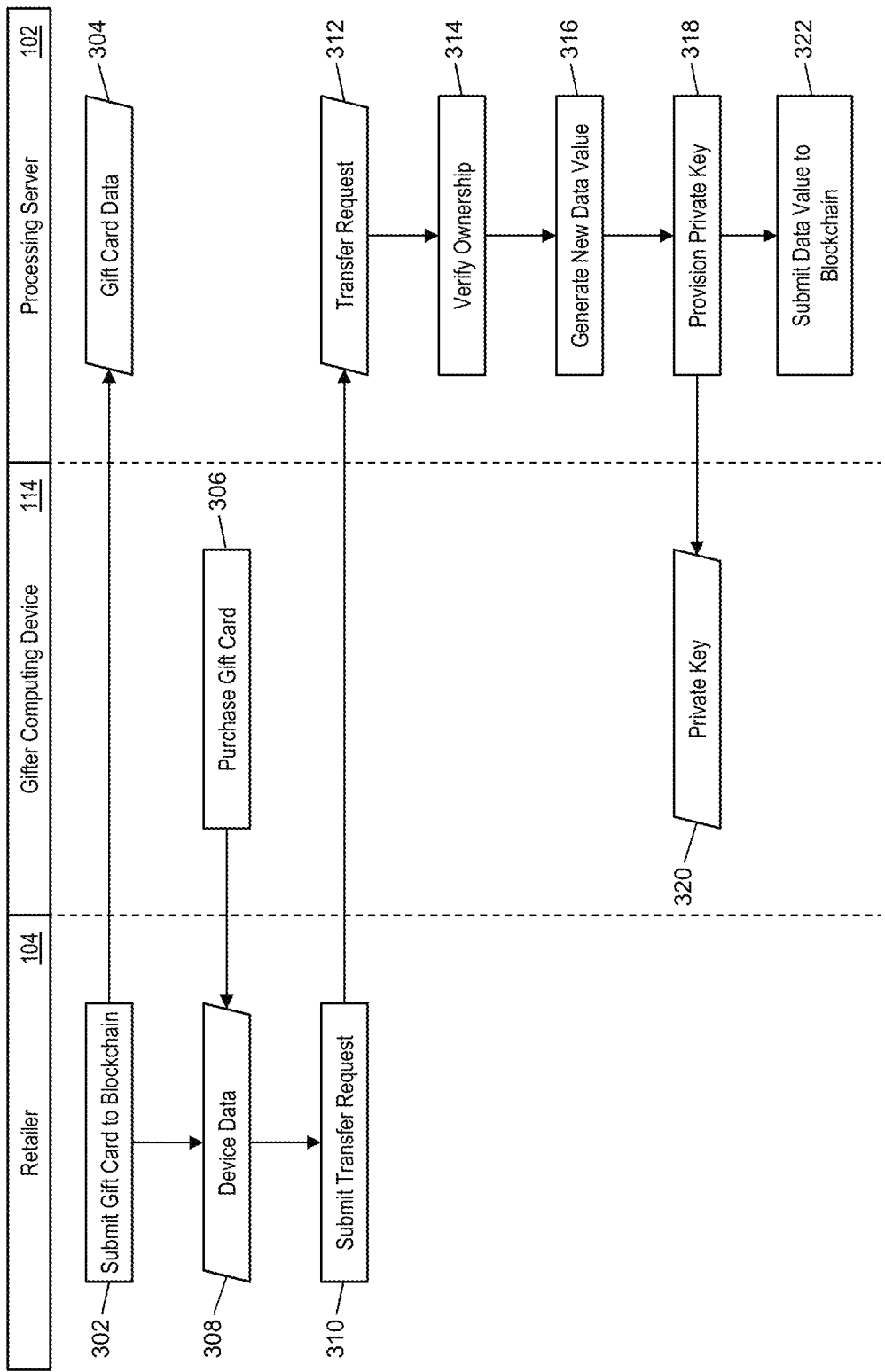
FIG. 3 is a flow diagram illustrating a process for the secure purchase of a gift card utilizing a blockchain in the system of FIG. 1 in accordance with exemplary embodiments.

FIG. 3 illustrates a process for the registration and purchase of a gift card in the system 100 that utilizes the blockchain for storage of details related thereto.

In step 302, the retailer 104 may submit gift card data for a new gift card available for purchase to a node 110 in the blockchain network 108 for addition to the blockchain associated therewith. The submission may include at least a gift card number, and any other gift card details used in redemption, and a blockchain address associated with the retailer 104. In step 304, the receiving device 202 of the processing server 102 may receive gift card data, which may comprise the gift card number and blockchain address, and may be received from the retailer 104 or by retrieval of the corresponding block in the blockchain (e.g., from a node 110).

In step 306, the gifter 112 may purchase the gift card via the gifter computing device 114. As part of the purchase, the gifter computing device 114 may electronically transmit a device identifier associated therewith to the retailer 104, along with any data necessary for use in processing the purchase of the gift card (e.g., payment data, delivery information, funding amount, etc.). In step 308, the retailer 104 may receive the device identifier from the gifter computing device 114 as part of the purchase. In step 310, the retailer 104 may submit a transfer request to the processing server 102 requesting transfer of the ownership of the gift card from the retailer 104 to the gifter 112. In step 312, the receiving device 202 of the processing server 102 may receive the transfer request, which may include at least the gift card number, the device identifier associated with the gifter computing device 114, and a digital signature generated by the retailer 104.

In step 314, the verification module 216 of the processing server 102 may verify that the retailer 104 has ownership of the gift card, by verifying the blockchain address included in the latest data value for the gift card (e.g., identified via the querying module 214 of the processing server 102 based on the gift card number) using the supplied digital signature.

Following verification, in step 316, the generation module 218 of the processing server 102 may generate a new data value for transfer of ownership to the gifter 112. The new data value may include at least the gift card number, the device identifier, and a new blockchain address that may be generated (e.g., via the generation module 218) using a public key of a key pair (e.g., generated via the generation module 218).

In step 318, the transmitting device 220 of the processing server 102 may electronically transmit the private key of the key pair to the gifter computing device 114, to be received thereby and stored on the gifter computing device 114, in step 320. In some cases, the private key may be accompanied by a notification regarding the successful registration of the purchase of the gift card by the gifter 112. In step 322, the transmitting device 220 of the processing server 102 may electronically transmit the new data value to a node 110 in the blockchain network 108 for addition to the blockchain associated therewith. In some embodiments, the transmitting device 220 of the processing server 102 may also electronically transmit a notification to the retailer 104, to inform the retailer 104 of the successful transfer of ownership.

Process for Transfer of a Gift Card Via Blockchain

Figure 4:
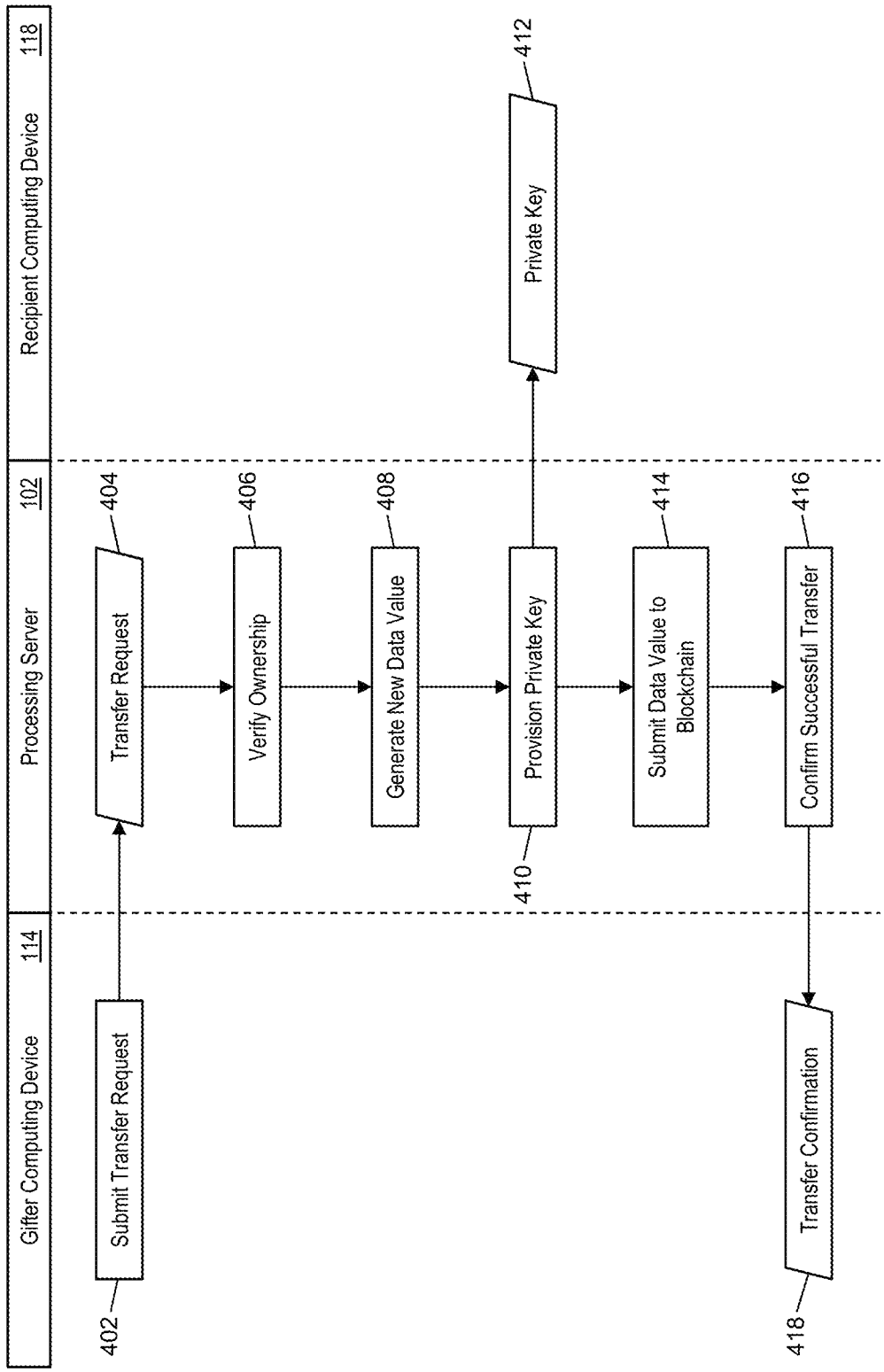
FIG. 4 is a flow diagram illustrating a process for the secure transfer of a gift card utilizing a blockchain in the system of FIG. 1 in accordance with exemplary embodiments.

FIG. 4 illustrates a process for the transfer of a gift card in the system 100 that utilizes the blockchain for storage of details related thereto.

In step 402, the gifter 112 may submit a transfer request for transfer of a purchased gift card (e.g., purchased via the process illustrated in FIG. 3 and discussed above) via the gifter computing device 114 to the processing server 102. In step 404, the receiving device 202 of the processing server 102 may receive the transfer request. The transfer request may include at least a device identifier associated with the recipient computing device 118 associated with the intended recipient 116 of the gift card, the gift card number, and a digital signature generated by the gifter computing device 114 (e.g., using the private key provisioned in step 320 of FIG. 3). In step 406, the verification module 216 of the processing server 102 may verify that the gifter computing device 114 has ownership of the gift card, by verifying the blockchain address included in the latest data value for the gift card (e.g., identified via the querying module 214 of the processing server 102 based on the gift card number) using the digital signature included in the transfer request. In some embodiments, the transfer request may further include the device identifier associated with the gifter computing device 114, which may also be verified against the device identifier included in the latest data value for the gift card.

In step 408, the generation module 218 of the processing server 102 may generate a new data value for transfer of ownership to the recipient 116. The new data value may include at least the gift card number, the device identifier associated with the recipient device 118, and a new blockchain address that may be generated (e.g., via the generation module 218) using a public key of a key pair (e.g., generated via the generation module 218). In step 410, the transmitting device 220 of the processing server 102 may electronically transmit the private key of the key pair to the recipient computing device 118, to be received thereby and stored on the recipient computing device 118, in step 412. In some cases, the private key may be accompanied by a notification regarding the successful registration of the transfer of ownership to the recipient 114. In some such cases, a message may be included in the notification, such as may be submitted in the transfer request, such as a gift message to the recipient 116. In step 414, the transmitting device 220 of the processing server 102 may electronically transmit the new data value to a node 110 in the blockchain network 108 for addition to the blockchain associated therewith. In step 416, the transmitting device 220 of the processing server 102 may also electronically transmit a notification to the gifter computing device 114, to inform the gifter 112 of the successful transfer of ownership. In step 418, the gifter computing device 114 may receive the notification confirming the successful transfer.

Process for Redemption of a Gift Card Via Blockchain

Figure 5:
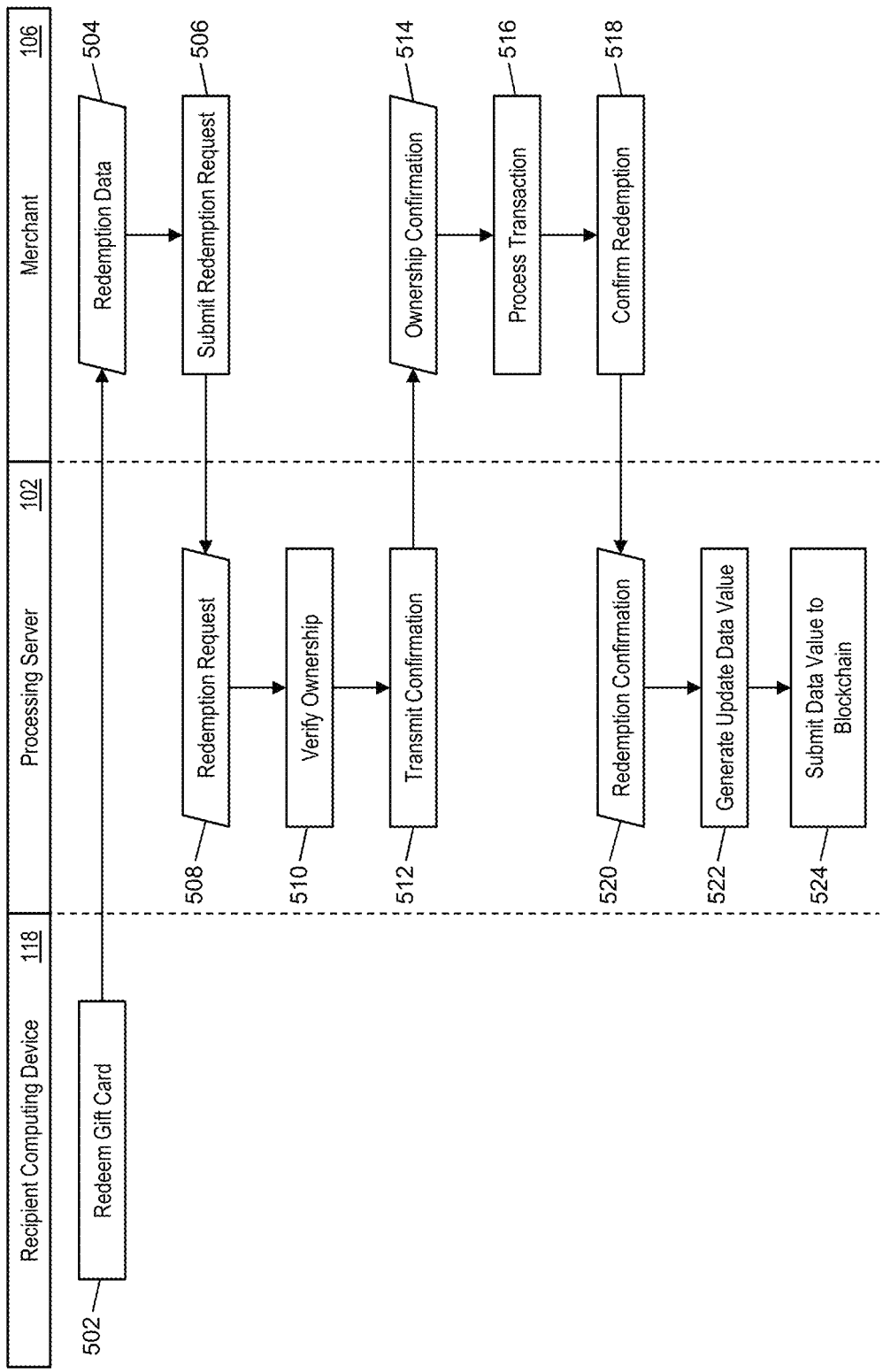
FIG. 5 is a flow diagram illustrating a process for the secure redemption of a gift card utilizing a blockchain in the system of FIG. 1 in accordance with exemplary embodiments.

FIG. 5 illustrates a process for the redemption of a gift card in the system 100 that utilizes the blockchain for storage of details related thereto.

In step 502, the recipient computing device 118 may submit data to the merchant 106 for redemption of the gift card previously transferred to the recipient 116 (e.g., via the process illustrated in FIG. 4 and discussed above). In step 504, the merchant 106 may receive the redemption data, which may include at least the gift card number, a device identifier associated with the recipient computing device 118, and a digital signature generated by the recipient computing device 118 (e.g., using the private key provisioned thereto in step 412 of FIG. 4). In step 506, the merchant 106 may submit the redemption data to the processing server 102 in a redemption request. In step 508, the receiving device 202 of the processing server 102 may receive the redemption request, which may include the device identifier, gift card number, and digital signature.

In step 510, the verification module 216 of the processing server 102 may verify that the recipient computing device 118 has ownership of the gift card, by verifying the blockchain address included in the latest data value for the gift card (e.g., identified via the querying module 214 of the processing server 102 based on the gift card number) using the digital signature included in the redemption request, as well as verifying that the device identifier included in the latest data value corresponds to the device identifier included in the redemption request. In step 512, the transmitting device 220 of the processing server 102 may electronically transmit a confirmation to the merchant 106 that includes the result of the verification, such as indicating that the recipient 116 is the genuine owner of the gift card. In step 514, the merchant 106 may receive the confirmation from the processing server 102.

In step 516, the merchant 106 may process an electronic payment transaction involving the recipient 116 that includes redemption of the gift card. In step 518, the merchant 106 may electronically transmit a redemption confirmation to the processing server 102 indicating that the gift card has been redeemed. In step 520, the receiving device 202 of the processing server 102 may receive the confirmation, which may include at least the gift card number. In step 522, the generation module 218 of the processing server 102 may generate a new data value for submission to the blockchain that includes at least the gift card number. In some cases, the data value may include an indication that the gift card has been redeemed. In other cases, the data value may include a blockchain address associated with the retailer 104 or a third party entity indicating transfer of ownership thereto. In step 524, the transmitting device 220 of the processing server 102 may electronically transmit the new data value to a node 110 in the blockchain network 108 for addition to the blockchain associated therewith.

Method for Secure Usage of a Gift Card Via Blockchain

Figure 6:
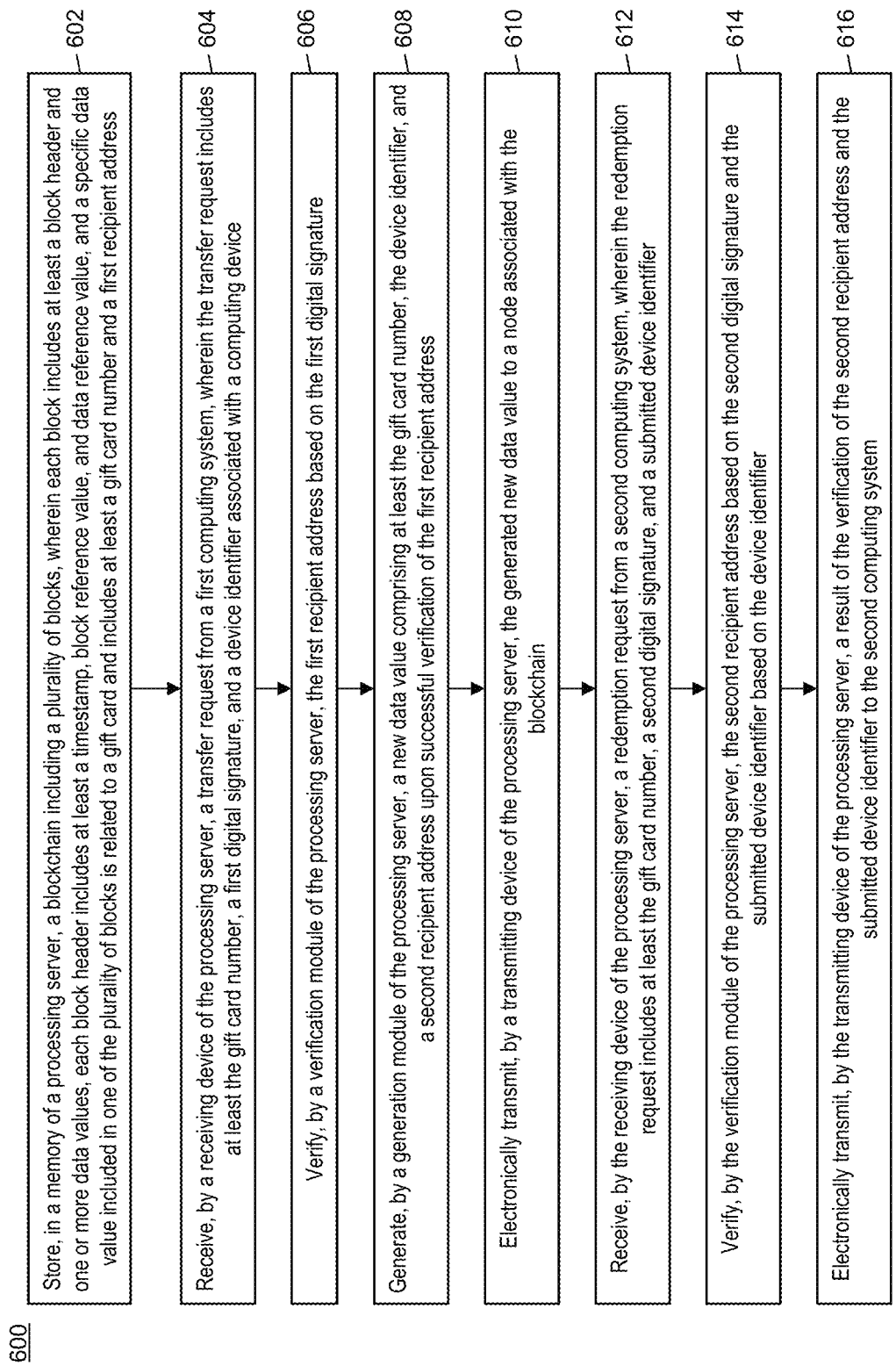
FIG. 6 is a flow chart illustrating an exemplary method for secure usage of a gift card via blockchain in accordance with exemplary embodiments.

FIG. 6 illustrates a method 600 for the secured transfer and usage of a gift card via blockchain for the storage of details associated therewith.

In step 602, a blockchain (e.g., the blockchain 208) includes a plurality of blocks may be stored in a memory (e.g., the memory 206) of a processing server (e.g., the processing server 102), wherein each block includes at least a block header and one or more data values, each block header includes at least a timestamp, block reference value, and data reference value, and a specific data value included in one of the plurality of blocks is related to a gift card and includes at least a gift card number and a first recipient address. In step 604, a transfer request may be received from a first computing system (e.g., the retailer 104) by a receiving device (e.g., the receiving device 202) of the processing server, wherein the transfer request includes at least the gift card number, a first digital signature, and a device identifier associated with a computing device (e.g., the gifter computing device 114).

In step 606, the first recipient address may be verified by a verification module (e.g., the verification module 216) of the processing server based on the first digital signature. In step 608, a new data value may be generated by a generation module (e.g., the generation module 218) of the processing server comprising at least the gift card number, the device identifier, and a second recipient address upon successful verification of the first recipient address. In step 610, the generated new value may be electronically transmitted by a transmitting device (e.g., the transmitting device 220) of the processing server to a node (e.g., a node 110) associated with the blockchain.

In step 612, a redemption request may be received by the receiving device of the processing server from a second computing system (e.g., the merchant 106), wherein the redemption request includes at least the gift card number, a second digital signature, and a submitted device identifier. In step 614, the second recipient address and the submitted device identifier may be verified by the verification module of the processing server based on the digital signature and the device identifier, respectively. In step 616, a result of the verification of the second recipient address and the submitted device identifier may be electronically transmitted by the transmitting device of the processing server to the second computing system.

In one embodiment, the method 600 may further include: generating, by the generation module of the processing server, a key pair comprised of a private key and public key, wherein the key pair is associated with the second recipient address; and electronically transmitting, by the transmitting device of the processing server, the private key to the computing device associated with the device identifier. In a further embodiment, the method 600 may even further include generating, by the generation module of the processing server, the second recipient address using the public key. In some embodiments, the computing device may be external to the first computing system or the second computing system. In one embodiment, the redemption request may further include an indication of transfer and at least a second device identifier associated with a second computing device (e.g., the recipient computing device 118), the second computing system may include the computing device, and the method 600 may also include: generating, by the generation module of the processing server, a subsequent data value comprising at least the gift card number, the second device identifier, and a third recipient address; and electronically transmitting, by the transmitting device of the processing server, the generated subsequent data value to a node associated with the blockchain.

In some embodiments, the specific data value may further include a gift card balance. In a further embodiment, the redemption request may further include a transaction amount, and verification of the second recipient address and the submitted device identifier may further include verification that the gift card balance is at least equal to the transaction amount. In an even further embodiment, the method 600 may further include: receiving, by the receiving device of the processing server, a transaction confirmation, wherein the transaction confirmation includes at least the gift card number and the transaction amount; generating, by the generation module of the processing server, an updated data value comprising at least the gift card number, the second device identifier, and an updated balance amount based on the gift card balance and the transaction amount; and electronically transmitting, by the transmitting device of the processing server, the generated updated data value to a node associated with the blockchain.

Computer System Architecture

Figure 7:
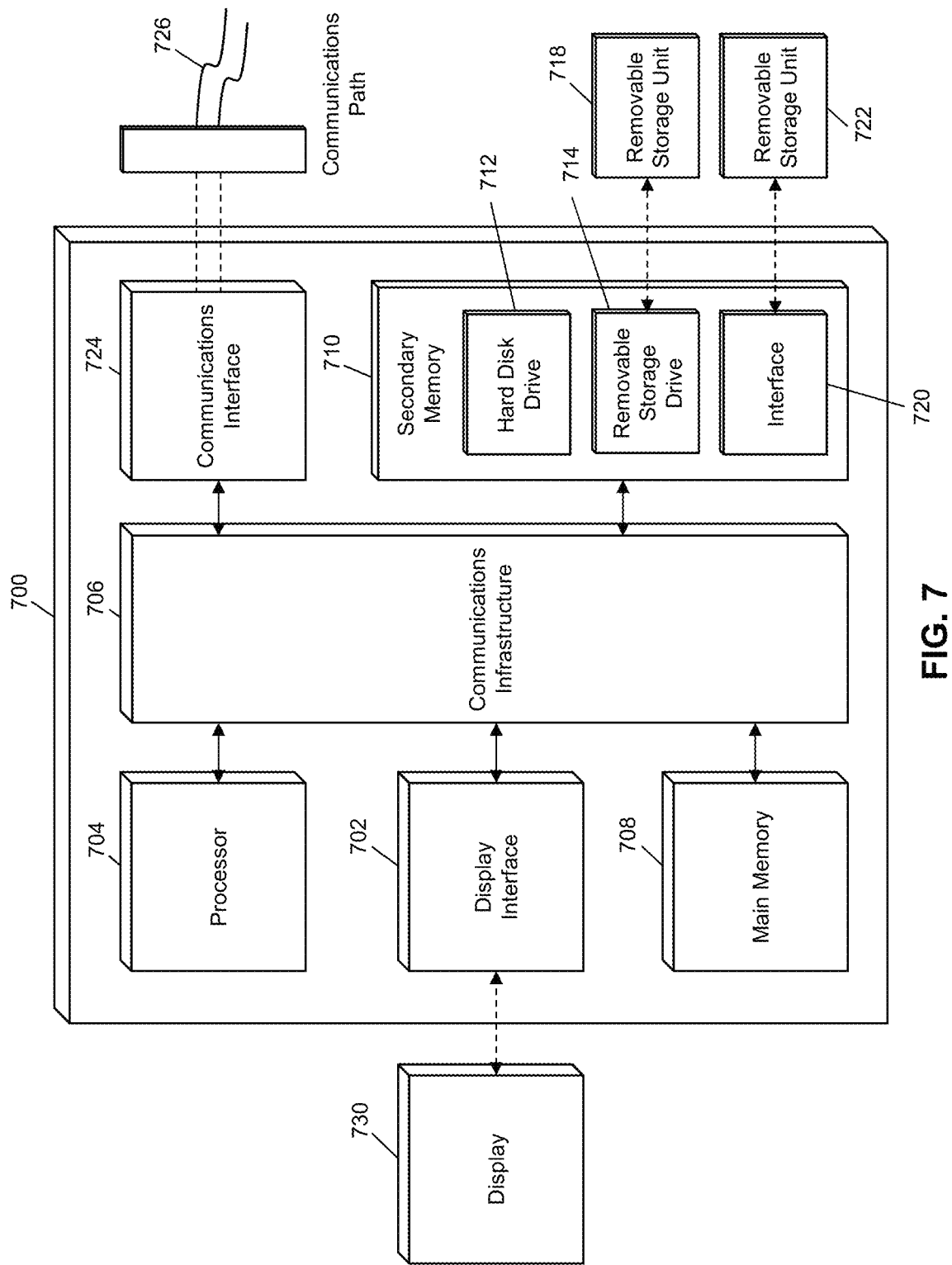
FIG. 7 is a block diagram illustrating a computer system architecture in accordance with exemplary embodiments.

FIG. 7 illustrates a computer system 700 in which embodiments of the present disclosure, or portions thereof, may be implemented as computer-readable code. For example, the computing device 102 of FIG. 1 may be implemented in the computer system 700 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3-6.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 718, a removable storage unit 722, and a hard disk installed in hard disk drive 712.

Various embodiments of the present disclosure are described in terms of this example computer system 700. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 704 may be a special purpose or a general purpose processor device specifically configured to perform the functions discussed herein. The processor device 704 may be connected to a communications infrastructure 706, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 700 may also include a main memory 708 (e.g., random access memory, read-only memory, etc.), and may also include a secondary memory 710. The secondary memory 710 may include the hard disk drive 712 and a removable storage drive 714, such as a floppy disk drive, a magnetic tape drive, an optical disk drive, a flash memory, etc.

The removable storage drive 714 may read from and/or write to the removable storage unit 718 in a well-known manner. The removable storage unit 718 may include a removable storage media that may be read by and written to by the removable storage drive 714. For example, if the removable storage drive 714 is a floppy disk drive or universal serial bus port, the removable storage unit 718 may be a floppy disk or portable flash drive, respectively. In one embodiment, the removable storage unit 718 may be non-transitory computer readable recording media.

In some embodiments, the secondary memory 710 may include alternative means for allowing computer programs or other instructions to be loaded into the computer system 700, for example, the removable storage unit 722 and an interface 720. Examples of such means may include a program cartridge and cartridge interface (e.g., as found in video game systems), a removable memory chip (e.g., EEPROM, PROM, etc.) and associated socket, and other removable storage units 722 and interfaces 720 as will be apparent to persons having skill in the relevant art.

Data stored in the computer system 700 (e.g., in the main memory 708 and/or the secondary memory 710) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 700 may also include a communications interface 724. The communications interface 724 may be configured to allow software and data to be transferred between the computer system 700 and external devices. Exemplary communications interfaces 724 may include a modem, a network interface (e.g., an Ethernet card), a communications port, a PCMCIA slot and card, etc. Software and data transferred via the communications interface 724 may be in the form of signals, which may be electronic, electromagnetic, optical, or other signals as will be apparent to persons having skill in the relevant art. The signals may travel via a communications path 726, which may be configured to carry the signals and may be implemented using wire, cable, fiber optics, a phone line, a cellular phone link, a radio frequency link, etc.

The computer system 700 may further include a display interface 702. The display interface 702 may be configured to allow data to be transferred between the computer system 700 and external display 730. Exemplary display interfaces 702 may include high-definition multimedia interface (HDMI), digital visual interface (DVI), video graphics array (VGA), etc. The display 730 may be any suitable type of display for displaying data transmitted via the display interface 702 of the computer system 700, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 708 and secondary memory 710, which may be memory semiconductors (e.g., DRAMs, etc.). These computer program products may be means for providing software to the computer system 700. Computer programs (e.g., computer control logic) may be stored in the main memory 708 and/or the secondary memory 710. Computer programs may also be received via the communications interface 724. Such computer programs, when executed, may enable computer system 700 to implement the present methods as discussed herein. In particular, the computer programs, when executed, may enable processor device 704 to implement the methods illustrated by FIGS. 3-6, as discussed herein. Accordingly, such computer programs may represent controllers of the computer system 700. Where the present disclosure is implemented using software, the software may be stored in a computer program product and loaded into the computer system 700 using the removable storage drive 714, interface 720, and hard disk drive 712, or communications interface 724.

The processor device 704 may comprise one or more modules or engines configured to perform the functions of the computer system 700. Each of the modules or engines may be implemented using hardware and, in some instances, may also utilize software, such as corresponding to program code and/or programs stored in the main memory 708 or secondary memory 710. In such instances, program code may be compiled by the processor device 704 (e.g., by a compiling module or engine) prior to execution by the hardware of the computer system 700. For example, the program code may be source code written in a programming language that is translated into a lower level language, such as assembly language or machine code, for execution by the processor device 704 and/or any additional hardware components of the computer system 700. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 700 to perform the functions disclosed herein. It will be apparent to persons having skill in the relevant art that such processes result in the computer system 700 being a specially configured computer system 700 uniquely programmed to perform the functions discussed above.

Techniques consistent with the present disclosure provide, among other features, systems and methods for secure usage of gift cards via blockchain. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for secure usage of a gift card via blockchain, comprising:
   receiving, by a first node in a blockchain network, from a retailer computing device of a retailer, a registration request including a specific data value related to a gift card, said specific data value including a gift card number and a first blockchain address associated with the retailer;
   registering, by the first node in the blockchain network, the gift card on a blockchain associated with the retailer, wherein the blockchain network comprises a plurality of nodes, wherein each node of the blockchain network stores the blockchain and wherein registering the gift card includes (i) generating a first new block including said specific data value, (ii) adding the first new block to the blockchain, and (iii) provisioning the first new block to each of the nodes in the blockchain;
   receiving, by a receiving device of a processing server, the first new block from the first node, wherein the processing server is a second node in the blockchain network;
   storing, in a memory of the processing server, the blockchain, wherein
     the blockchain includes a plurality of blocks including the first new block,
     each block in the blockchain includes at least a block header and one or more data values,
     each block header includes at least a timestamp, block reference value, and data reference value, and
     the first new block includes the specific data value related to the gift card and includes at least the gift card number and the first blockchain address;
   provisioning, by the processing server, a first private key, of a key pair, to a gifter computing device of a gifter;
   receiving, by the receiving device of the processing server, a first transfer request from the first blockchain address, wherein the first transfer request is associated with a transfer of the gift card from the retailer to the gifter, wherein the first transfer request includes at least the gift card number, a first digital signature of the retailer, a device identifier associated with the retailer computing device, a device identifier associated with the gifter computing device, and a second blockchain address associated with the gifter;
   verifying, by a verification module of the processing server, the first blockchain address based on the first digital signature and verifying the device identifier associated with the retailer computing device;
   in response to verifying the first blockchain address and verifying the device identifier associated with the retailer computing device, generating, by a generation module of the processing server, a new data value for the blockchain comprising at least the gift card number, the device identifier associated with the gifter computing device, and the second blockchain address, and
   generating a second new block in the blockchain including the new data value, wherein the new data value is associated with the first private key;
   electronically transmitting, by a transmitting device of the processing server, the generated second new block to each of the nodes in the blockchain;
   receiving, by the receiving device of the processing server, a second transfer request from the gifter computing device, wherein the second transfer request is associated with a transfer of the gift card from the gifter to a recipient and includes (i) at least the gift card number, (ii) a device identifier associated with a recipient computing device of the recipient, (iii) a second digital signature of the gifter, (iv) the device identifier associated with the gifter computing device, and (v) a third blockchain address associated with the recipient;
   verifying, by the verification module of the processing server, the second blockchain address based on the second digital signature and verifying, by the verification module of the processing server, the device identifier associated with the gifter computing device;
   in response to verifying the second blockchain address and verifying the device identifier associated with the gifter computing device, recording, by the generation module of the processing server, the transfer of the gift card from the gifter to the recipient by
     generating a second new data value for the blockchain, the second new data value (i) including the gift card number, the device identifier associated with the recipient computing device, and the third blockchain address, and (ii) indicating transfer of the gift card from the second blockchain address to the third blockchain address, and
     generating a third new block in the blockchain including the second new data value;
   in response to recording the transfer of the gift card from the gifter to the recipient in the blockchain,
     electronically transmitting, by the transmitting device of the processing server, the generated third new block to each of the nodes in the blockchain, and
     electronically transmitting, by the transmitting device of the processing server, a notification to the gifter computing device and the recipient computing device, said notification indicating a successful transfer of the gift card from the gifter to the recipient.

2. The method of claim 1, further comprising:
   generating, by the generation module of the processing server, a key pair comprised of a second private key and a public key, wherein the key pair is associated with the third blockchain address; and
   electronically transmitting, by the transmitting device of the processing server, the second private key to the recipient computing device.

3. The method of claim 2, further comprising:
   generating, by the generation module of the processing server, the third blockchain address using the public key.

4. The method of claim 1, wherein the specific data value further includes a gift card balance.

5. The method of claim 4, further comprising:
   receiving, by the receiving device of the processing server, a redemption request that includes a transaction amounal and verifying, by the verification module of the processing server, that the gift card balance is at least equal to the transaction amount.

6. The method of claim 5, further comprising:
receiving, by the receiving device of the processing server, a transaction confirmation, wherein the transaction confirmation includes at least the gift card number and the transaction amount;
generating, by the generation module of the processing server, an updated data value comprising at least the gift card number and an updated balance amount based on the gift card balance and the transaction amount; and
electronically transmitting, by the transmitting device of the processing server, the generated updated data value to a node in the blockchain.

7. A system for secure usage of a gift card via blockchain, comprising:
a first node, in a blockchain network, said first node:
receives, from a retailer computing device of a retailer, a registration request including a specific data value related to a gift card, said specific data value including a gift card number and a first blockchain address associated with the retailer; and
registers the gift card on a blockchain associated with the retailer, wherein the blockchain network comprises a plurality of nodes, wherein each node of the blockchain network stores the blockchain, and wherein the first node registers the gift card by (i) generating a first new block including said specific data value, (ii) adding the first new block to the blockchain, and (iii) provisioning the first new block to each of the nodes in the blockchain;
a processing server including a memory storing instructions thereon, and a processing device coupled to the memory, wherein said processing server is a second node in the blockchain network, and wherein said processing server executes said instructions, said instructions causing said processing server to:
provision a first private key, of a key pair, to a gifter computing device of a gifter;
receive the first new block, from the first node;
store, in the memory, the blockchain, wherein
the blockchain includes a plurality of blocks including the first new block,
each block in the blockchain includes at least a block header and one or more data values,
each block header includes at least a timestamp, block reference value, and data reference value, and
the first new block includes the specific data value related to the gift card and includes at least the gift card number and the first blockchain address;
receive a first transfer request from the first blockchain address, wherein the first transfer request is associated with a transfer of the gift card from the retailer to the gifter, wherein the first transfer request includes at least the gift card number, a first digital signature of the retailer, a device identifier associated with the retailer computing device, a device identifier associated with the gifter computing device, and a second blockchain address associated with the gifter;
verify the first blockchain address based on the first digital signature and verify the device identifier associated with the retailer computing device;
in response to verifying the first blockchain address and verifying the device identifier associated with the retailer computing device, generate, a new data value for the blockchain comprising at least the gift card number, the device identifier associated with the gifter computing device, and the second blockchain address, and generate a second new block in the blockchain including the new data value, wherein the new data value is associated with the first private key;
electronically transmit the generated second new block to each of the nodes in the blockchain;
receive a second transfer request from the gifter computing device, wherein the second transfer request is associated with a transfer of the gift card from the gifter to a recipient and includes at least (i) the gift card number, (ii) a device identifier associated with a recipient computing device of the recipient, (iii) a second digital signature of the gifter, (iv) the device identifier associated with the gifter computing device, and (v) a third blockchain address associated with the recipient;
verify the second blockchain address based on the second digital signature and verify the device identifier associated with the gifter computing device;
in response to verifying the second blockchain address and verifying the device identifier associated with the gifter computing device, record, in the blockchain, the transfer of the gift card from the gifter to the recipient by
generating a second new data value for the blockchain, the second new data value (i) including the gift card number, the device identifier associated with the recipient computing device, and the third blockchain address, and (ii) indicating transfer of the gift card from the second blockchain to the third blockchain address, and
generating a third new block in the blockchain including the second new data value;
in response to recording the transfer of the gift card from the gifter to the recipient in the blockchain,
electronically transmit the generated third new block to each of the nodes in the blockchain, and
electronically transmit a notification to the gifter computing device and the recipient computing device, said notification indicating a successful transfer of the gift card from the gifter to the recipient.

8. The system of claim 7, wherein the processing device is further configured to
generate a key pair comprised of a second private key and a public key, wherein the key pair is associated with the third blockchain address; and
electronically transmit the second private key to the recipient computing device.

9. The system of claim 8, wherein the processing device generates the third blockchain address using the public key.

10. The system of claim 7, wherein the specific data value further includes a gift card balance.

11. The system of claim 10, wherein the processing device is further configured to
receive a redemption request that includes a transaction amount; and
verify that the gift card balance is at least equal to the transaction amount.

12. The system of claim 11, wherein the processing server is further configured to
receive a transaction confirmation, wherein the transaction confirmation includes at least the gift card number and the transaction amount;
generate an updated data value comprising at least the gift card number and an updated balance amount based on the gift card balance and the transaction amount and electronically transmit the generated updated data value to a node in the blockchain.

* * * * *